United States Patent

Saporito et al.

(10) Patent No.: US 7,424,825 B2
(45) Date of Patent: Sep. 16, 2008

(54) BAROMETRIC ALTIMETER INCLUDING A TEMPERATURE COMPENSATION DEVICE

(75) Inventors: Giuseppe Saporito, Lausanne (CH); Stéphane Claude, Grenchen (CH); Christophe Germiquet, Prêles (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 11/750,799

(22) Filed: May 18, 2007

(65) Prior Publication Data

US 2007/0266783 A1    Nov. 22, 2007

(30) Foreign Application Priority Data

May 19, 2006    (EP) .................................. 06114255

(51) Int. Cl.
*G01L 7/20* (2006.01)
(52) U.S. Cl. ............................... 73/384; 73/387; 73/386
(58) Field of Classification Search .................. 73/384, 73/386, 387
See application file for complete search history.

(56) References Cited

U.S. PATENT DOCUMENTS

| 2,412,541 | A | * | 12/1946 | Shivers ......................... 73/387 |
| 3,958,459 | A | * | 5/1976 | Shimomura ................... 73/384 |
| 4,253,335 | A | * | 3/1981 | Shimomura ................... 73/384 |
| 5,224,059 | A | | 6/1993 | Nitta et al. |
| 6,678,629 | B2 | * | 1/2004 | Tsuji .......................... 702/139 |
| 7,353,129 | B2 | * | 4/2008 | Lerch et al. ................... 702/94 |
| 2004/0233788 | A1 | | 11/2004 | Plancon et al. |
| 2006/0000286 | A1 | * | 1/2006 | Makela et al. ................ 73/700 |
| 2006/0106559 | A1 | * | 5/2006 | Lerch ......................... 702/94 |
| 2007/0068245 | A1 | * | 3/2007 | Blondeau et al. .............. 73/179 |

FOREIGN PATENT DOCUMENTS

WO    2004070317 A1    8/2004

OTHER PUBLICATIONS

European Search Report issued in corresponding application No. EP 06 11 4255, completed Oct. 19, 2006.

* cited by examiner

*Primary Examiner*—Andre J Allen
(74) *Attorney, Agent, or Firm*—Griffin & Szipl, P.C.

(57) ABSTRACT

The present invention proposes a portable barometric altimeter (10) including a pressure sensor (14), a calculation unit (16) which determines an altitude value (H) as a function of the pressure (P) measured by the sensor (14) and as a function of a reference temperature ($T_0$) corresponding to an estimate of the temperature of the air mass at sea level, and a time measuring unit (18) that supplies calendar data (D), characterized in that it includes a correction circuit (32), which selects the reference temperature value ($T_0$) from among a series of values ($T_S$) contained in a database stored in the altimeter (10), as a function of the date (D) and as a function of a predefined climate value (C). The invention also proposes a method of determining altitude (H).

17 Claims, 1 Drawing Sheet

BAROMETRIC ALTIMETER INCLUDING A TEMPERATURE COMPENSATION DEVICE

The present invention concerns a portable barometric altimeter and a method of determining altitude for such an altimeter.

More specifically, the barometric altimeter according to the present invention comprises a pressure sensor, a calculation unit which determines an altitude value as a function of the pressure measured by the sensor and as a function of a reference temperature corresponding to an estimation of the temperature of the air mass at sea level, and a time measuring unit which provides calendar data.

The invention concerns in particular an altimeter of this type arranged in an electronic wristwatch.

In this type of altimeter, in order to obtain the altitude, the calculation unit implements a formula defined by international standards that shows the relation between the altitude, barometric pressure and temperature. This formula is as follows:

$$H = 153,85 * T_0 * [1 - (P/P_0)^{0,190255}] \quad (1)$$

In this formula, $T_0$ is the air mass temperature at sea level in degrees Kelvin, P is the barometric pressure measured by the altimeter in millibars, and $P_0$ is the atmospheric pressure at sea level in millibars.

Generally, the air mass temperature at sea level is fixed at a default value, which leads to errors in altitude calculation when the real temperature value of the air mass at sea level is different from this default value.

In order to correct these errors in part, U.S. Pat. No. 5,224,059 proposes storing in the altimeter a series of reference temperature values for the air mass at sea level corresponding to the different latitude values and different periods of the year. The person wearing the altimeter thus has to input manually the latitude of his position to enable the altimeter to select a determined reference temperature value as a function of the date.

This solution is not completely satisfactory since it requires the user to know the latitude of his position which is not always the case. Moreover, for a determined date, depending upon the longitude of the user's position on the terrestrial globe, the reference temperature value can vary enormously, which requires, either limiting the use of the altimeter to a determined area of the terrestrial globe, or requiring the user to input also the longitude value.

This solution thus has the drawback of not being sufficiently intuitive, which is detrimental to the ergonomics of the altimeter.

Moreover, this solution requires a significant storage capacity, which makes it expensive.

It is an object of the present invention to overcome these drawbacks by proposing a simple and economic solution for making a more intuitive altimeter.

Thus, the invention proposes a barometric altimeter of the type previously described, characterized in that it comprises a correction circuit which selects the reference temperature value, from among a series of values contained in a database stored in the altimeter, as a function of the date and as a function of a predefined climate value.

The altimeter according to the invention provides an accurate altitude value while guaranteeing great simplicity of use. In particular, the altimeter setting is easy to implement and does not require a significant storage capacity. For the user, inputting the climate is a simple intuitive operation to perform since, even without consulting a planisphere, the user will already know the climate of the place where he is situated.

Advantageously, the climate value is selected from among five predefined values, which are: temperate, Mediterranean, arid, tropical, polar. Experiments by the Applicant have demonstrated that the choice of these five climate values constitutes a good compromise between altitude calculation accuracy and simplicity of use of the altimeter. The reduced number of predefined climates also facilitates setting operation and inputting operations since the user only needs to scroll down five values and select one of them. It is not therefore necessary to provide any complex control members or awkward manipulations.

Moreover, the correction circuit selects the reference temperature value as a function of an indication of the altimeter's position relative to the equator selected from among two values respectively corresponding to the northern hemisphere and the southern hemisphere, which differentiates between the reference temperatures selected as a function of the hemisphere in which the altimeter is located.

To improve further the accuracy of the altitude calculations, the correction circuit adjusts the value of the reference temperature selected as a function of the date in the current month, so as to take account of temperature variations in the air mass over the month. The correction circuit can thus adjust the reference temperature value selected as a function of the time, so as to take account of temperature variations in the air mass during the day.

The invention also proposes a method of determining altitude for a portable barometric altimeter comprising the following steps:

automatically selecting a reference temperature value from among a series of values contained in a database stored in the altimeter, the reference temperature corresponding to a temperature estimate of the air mass at sea level;

measuring a pressure value via a pressure sensor;

calculating an altitude value as a function of the pressure value and as a function of the selected reference temperature;

characterized in that, during the selection step, the reference temperature value is selected as a function of the date and as a function of a predefined climate value.

This method has the same advantages as the altimeter according to the invention, i.e. a good compromise between altitude determination accuracy and operating simplicity.

According to other features of this method:

the climate value is selected from among five predefined values, which are: temperate, Mediterranean, arid, tropical and polar;

the reference temperature value is also selected as a function of an altimeter position indication relative to the equator selected from among two values respectively corresponding to the northern hemisphere and the southern hemisphere;

when the altimeter position is selected relative to the equator, a third value can be selected so as to control the working of the altimeter in an uncorrected mode, and, in the uncorrected mode, the reference temperature value is fixed at a determined value that does not take account of climate;

a first correction step is provided during which the reference temperature value, selected during the selection step, is adjusted as a function of the date in the current month so as to take account of variations in the air mass temperature during the month;

a second correction step is provided during which the reference temperature value, selected during the selection step, is adjusted as a function of the time, so as to take account of variations in the air mass temperature during the day;

a manual climate value selection step is provided.

Other features and advantages of the present invention will appear more clearly upon reading the following detailed description, made with reference to the annexed drawings, given by way of non-limiting example and in which:

FIG. 1 shows a portable barometric altimeter 10, which is made in accordance with the teaching of the invention.

Figure 1:
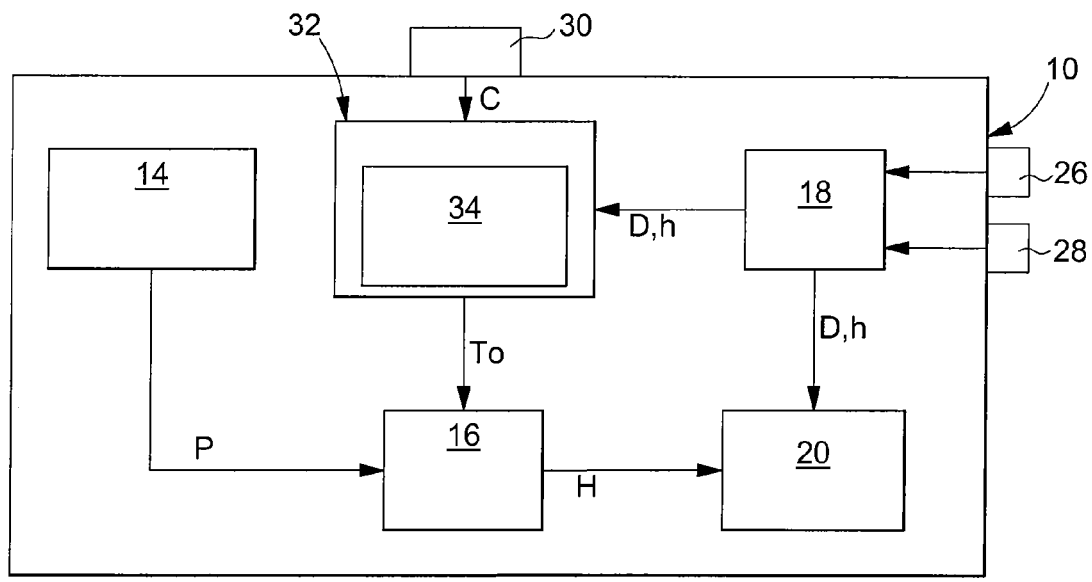
FIG. 1 is a diagram that shows a portable barometric altimeter made in accordance with the teaching of the invention.
Figure 2:
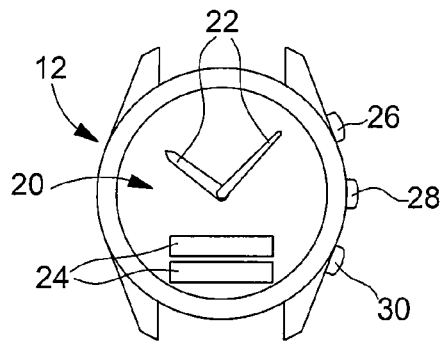
FIG. 2 is a top view that shows schematically a wristwatch fitted with the altimeter of FIG. 1.

Preferably, altimeter 10 is arranged in an electronic wristwatch 12 like that shown in FIG. 12. It comprises a pressure sensor 14, which is connected to a calculating unit 16 provided for determining an altitude value H as a function of the pressure P measured by sensor 14 and as a function of a reference temperature $T_0$ corresponding to an estimate of the air mass temperature at sea level. Calculating unit 16 implements formula (1) defined above to calculate altitude H.

Wristwatch 12 also includes a time measuring unit 18, which is provided for supplying the time h and calendar information, here the date D, and display means 20, formed here by hands 22 and by two liquid crystal screens 24.

In the example shown, the time h is displayed in an analogue manner by means of hands 22 and the date D and altitude H are digitally displayed by means of screens 24.

Wristwatch 12 further includes manual control members 26, 28, 30 for controlling the various functions of the wristwatch. A first push-button 26 can be used for setting date D, a time-setting crown 28 can be used for setting the time h.

In accordance with the teaching of the invention, altimeter 10 includes a correction circuit 32 that selects the reference temperature value $T_0$, from among a series of standard temperature values $T_S$ contained in a database loaded in altimeter 10, as a function of the date D and as a function of a predefined climate value C. Correction circuit 32 includes for this purpose a memory 34 in which the database is stored.

The database is shown below in the form of a table (2).

Table (2) contains for each month of the year and for each predefined climate value C, a standard temperature $T_S$ in degrees Celsius corresponding overall to a mean temperature value of the air mass at sea level for that month and for that climate C.

Climate values C preferably include five predefined values, which are: temperate climate $C_{Te}$, Mediterranean climate $C_{Me}$, arid climate $C_{Ar}$, tropical climate $C_{Tr}$, polar climate $C_{Po}$. These climate values C correspond to a simplified version of the Köppen climate classification.

In order to take account of the temperature differences between certain climates in the northern hemisphere and the southern hemisphere, and to take account of the season reversal between the two hemispheres, the temperate climate $C_{Te}$, Mediterranean climate $C_{Me}$, and arid climate $C_{Ar}$, have been respectively doubled into the southern hemisphere temperate climate $C_{TeS}$, the southern hemisphere Mediterranean climate $C_{MeS}$, and the southern hemisphere arid climate $C_{ArS}$.

Figure 3:
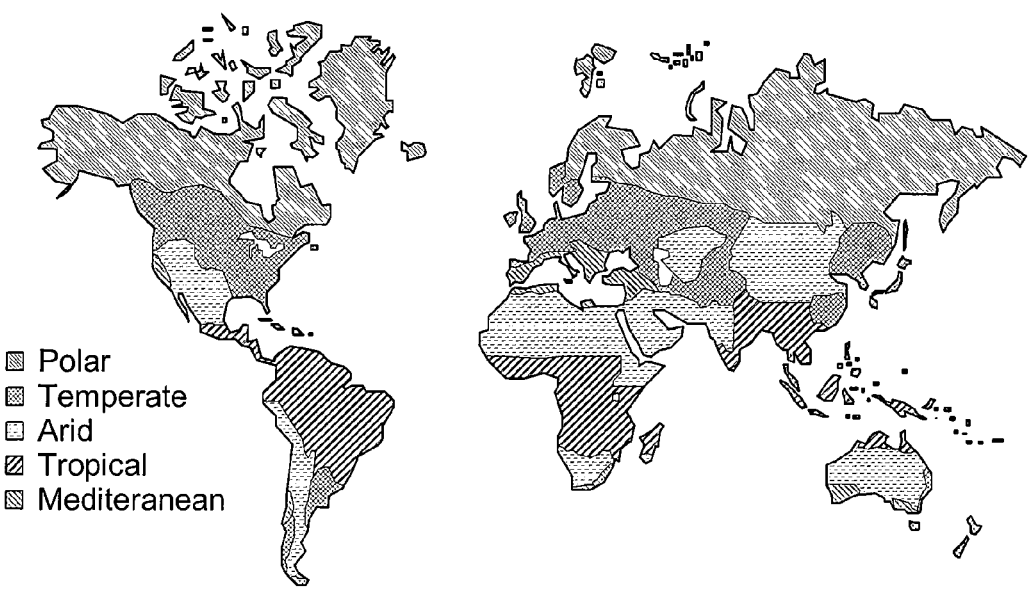
FIG. 3 is a diagram that illustrates a planisphere divided into zones corresponding to five predefined climates.

FIG. 3 shows a planisphere divided into zones corresponding to the five predefined climates $C_{Te}$, $C_{Me}$, $C_{Ar}$, $C_{Tr}$, $C_{Po}$.

Preferably, the climate value C is selected manually by the user of wristwatch 12, as a function of the position of altimeter 10 on the planisphere, here by means of a second push-button 30. In order to allow correction circuit 32 to select the appropriate climate value C as a function of the hemisphere in which altimeter 10 is located, the step of selecting climate C is preceded by a step of selecting the position of altimeter 10 relative to the equator selected from among two values respectively corresponding to the northern hemisphere and the southern hemisphere.

It will be noted that, in the embodiment shown, a single series of standard temperature values $T_S$ is provided for the tropical zone and a single series for the polar zone, without taking account of the position of altimeter 10 relative to the equator.

Advantageously, during selection of the position of altimeter 10 relative to the equator, a third value can be selected so as to control the operation of altimeter 10 in an uncorrected mode. In the uncorrected mode, the value of reference temperature $T_0$ is fixed at a determined value, for example 15° C., which does not take account of climate C. This uncorrected mode can be the default operating mode of wristwatch 12, when it leaves the factory. Thus, until the user of wristwatch 12 has input the data relating to the hemisphere in which he is located, the reference temperature $T_0$ used in formula (1) remains at 15° C. The uncorrected mode is an operating mode in which the user has not selected a climate C.

TABLE 2

STANDARD TEMPERATURES

| | JANUARY | FEBRUARY | MARCH | APRIL | MAY | JUNE | JULY | AUGUST | SEPTEMBER | OCTOBER | NOVEMBER | DECEMBER |
|---|---|---|---|---|---|---|---|---|---|---|---|---|
| Polar | −10 | −8 | −3 | 2 | 9 | 14 | 16 | 13 | 9 | 3 | −5 | −10 |
| Temperate | −2 | −1 | 3 | 9 | 14 | 19 | 21 | 20 | 16 | 11 | 5 | 0 |
| Southern hemisphere temperate | 21 | 21 | 19 | 16 | 13 | 11 | 10 | 11 | 13 | 15 | 18 | 20 |
| Mediterranean | 7 | 8 | 10 | 13 | 17 | 20 | 22 | 22 | 20 | 16 | 11 | 8 |
| Southern hemisphere Mediterranean | 21 | 21 | 19 | 16 | 13 | 11 | 11 | 11 | 13 | 15 | 17 | 20 |
| Arid | 11 | 14 | 18 | 22 | 25 | 28 | 29 | 28 | 26 | 22 | 17 | 13 |
| Southern hemisphere arid | 23 | 23 | 22 | 19 | 16 | 13 | 13 | 14 | 17 | 19 | 21 | 22 |
| Tropical | 21 | 21 | 23 | 24 | 25 | 26 | 26 | 27 | 26 | 25 | 23 | 22 |

According to an advantageous embodiment, during the manual selection of climate value C by the user of wristwatch 12, at least one screen 24 is used for scrolling down and displaying the various possible climate values C.

Advantageously, the reference temperature value $T_0$ corresponding to a given month for a given climate C is not constant over the month but varies in accordance with a determined variation rule so as to take account of temperature variations in the air mass during a month. Thus, correction circuit 32 adjusts the reference temperature value $T_0$ corresponding to the current month and to the selected climate C as a function of the day of the current month and following the variation rule. This variation rule is for example defined, for a given climate C, by a line segment which connects the standard temperature value $T_S$ of one month to the standard temperature value $T_S$ of the following month, the standard temperature $T_S$ stored in the database corresponding to the reference temperature $T_0$ in the middle of the month, i.e. to "15" or "15.5" of the month.

Considering table (2) and taking as an example the temperate climate of the northern hemisphere $C_{Te}$, the line segment defining the variations in reference temperature $T_0$ pass through 14° C. on 15 May and through 19° C. on 15 June. This line segment thus defines the variations in reference temperature $T_0$ during the second half of the month of May and the first half of the month of June. The same is true for the other months of the year and the other climates C.

According to a further improved embodiment, correction circuit 32 can also adjust the selected reference temperature value $T_0$ as a function of the time h, so as to take account of temperature variations in the air mass during the day, in particular to differentiate the temperature during the day from the temperature during the night.

It will be noted however that very good results are already obtained for altitude calculations H without adjusting reference temperature value $T_0$ as a function of time h.

We will now describe the method of determining altitude H implemented by wristwatch 12 fitted with the portable barometric altimeter 10 according to the invention.

The method comprises an initialisation step during which the user inputs into wristwatch 12 the climate value C of the zone of the planisphere in which he is situated by using the second push-button 30. For example, if the user is situated in Switzerland, he first selects the northern hemisphere, then the temperate climate value $C_{Te}$.

Once it knows the climate value C, in a selection step, correction circuit 32 automatically selects a reference temperature value $T_0$, from among the series of standard temperatures $T_S$ corresponding to the temperate climate $C_{Te}$, as a function of the date D provided by time measuring unit 18. For example, if the date D is 20 July, correction circuit 32 selects the value "21" as reference temperature $T_0$.

Moreover, during a first correction step, correction circuit 32 adjusts the value of this reference temperature $T_0$, as a function of the date in the current month. In the aforementioned example, the date is 20 July. Thus, following the line segment that connects the value 21° C. corresponding to 15 July to the corresponding value 20° C. on 15 August, correction circuit 32 determines that the reference temperature must be equal to around 20.83° C.

According to an improved embodiment, during a second correction step, correction circuit 32 applies a determined correction coefficient to reference temperature $T_0$, as a function of the time of day h. For example, when pressure measurements P are carried out at around two o'clock in the morning, thus during the night, in July, the reference temperature value $T_0$ may be reduced by four degrees Celsius.

During a calculation step, calculation unit 16 of altimeter 10 determines the value of altitude H as a function of the pressure measurement P carried out by sensor 14 and as a function of the selected reference temperature $T_0$ adjusted by correction circuit 32.

During a display step, display means 20, here screens 24, display the altitude value H calculated by the calculation unit.

At each new pressure measurement P, calculation unit 16 uses, to calculate altitude H, the selected reference temperature $T_0$ adjusted by correction circuit 32. Thus, the calculation of altitude H is always carried out by using an appropriate reference temperature $T_0$, since the latter is adapted to the date D and to the time of day h.

According to a variant, altimeter 10 according to the invention can also include a correction circuit for correcting the reference pressure value P0 used in formula (1) for calculating altitude H, particularly in order to differentiate pressure variations P due to weather changes from those due to movements by the user of altimeter 10.

What is claimed is:

1. A portable barometric altimeter comprising a pressure sensor, a calculation unit which determines an altitude value as a function of the pressure measured by the sensor and as a function of a reference temperature corresponding to an estimate of the temperature of the air mass at sea level, and a time measuring unit that supplies calendar data, further including a correction circuit, which selects the reference temperature value from among a series of values contained in a database stored in the altimeter, as a function of the date and as a function of a predefined climate value.

2. The altimeter according to claim 1, wherein the climate value is selected from among five predefined values which are: temperate $C_{Te}$, Mediterranean $C_{Me}$, arid $C_{Ar}$, tropical $C_{Tr}$, polar $C_{Po}$.

3. The altimeter according to claim 1, wherein the correction circuit also selects the reference temperature value as a function of an indication of the position of the altimeter relative to the equator, selected from among two values respectively corresponding to the northern hemisphere and the southern hemisphere.

4. The altimeter according to claim 1, wherein the correction circuit also adjust the selected reference temperature value as a function of the date of the current month, so as to take account of variations in the air mass temperature during the month.

5. The altimeter according to claim 1, wherein the correction circuit also adjusts the selected reference temperature value as a function of the time, so as to take account of variations in the air mass temperature during the day.

6. The altimeter according to claim 1, including means for manually inputting the predefined climate value.

7. The method of determining altitude for a portable barometric altimeter including the following steps:
   automatically selecting a reference temperature value from among a series of values contained in a database stored in the altimeter, the reference temperature corresponding to an estimate of the air mass temperature at sea level,
   measuring a pressure value via a pressure sensor,
   calculating an altitude value as a function of the pressure value and as a function of the selected reference temperature value,
   wherein, during the selection step, the reference temperature value is selected as a function of the date and as a function of the predefined climate value.

8. The method according to claim 7, wherein the climate value is selected from among five predefined values, which are: temperate $C_{Te}$, Mediterranean $C_{Me}$, arid $C_{Ar}$, tropical $C_{Tr}$, polar $C_{Po}$.

9. The method according to claim 7, wherein the reference temperature value is also selected as a function of an indication of the position of the altimeter relative to the equator, selected from among two values respectively corresponding to the northern hemisphere and the southern hemisphere.

10. The method according to claim 9, wherein, during selection of the position of the altimeter relative to the equator, a third value can be selected so as to control the operation of the altimeter in an uncorrected mode, and wherein, in the uncorrected mode, the reference temperature value is fixed at a determined value that does not take account of climate.

11. The method according to claim 7, including a first correction step during which the reference temperature value selected during the selection step, is adjusted as a function of the date in the current month so as to take account of variations in the air mass temperature during the month.

12. The method according to claim 7, including a second correction step during which the reference temperature value selected during the selection step, is adjusted as a function of the time, so as to take account of variations in the air mass temperature during the day.

13. The method according to claim 7, further including a step of manually selecting the climate value.

14. The method according to claim 8, wherein the reference temperature value is also selected as a function of an indication of the position of the altimeter relative to the equator, selected from among two values respectively corresponding to the northern hemisphere and the southern hemisphere.

15. The method according to claim 8, including a first correction step during which the reference temperature value selected during the selection step, is adjusted as a function of the date in the current month so as to take account of variations in the air mass temperature during the month.

16. The method according to claim 8, including a second correction step during which the reference temperature value selected during the selection step, is adjusted as a function of the time, so as to take account of variations in the air mass temperature during the day.

17. The method according to claim 8, further including a step of manually selecting the climate value.

* * * * *